(12) United States Patent
Batura et al.

(10) Patent No.: US 11,273,901 B2
(45) Date of Patent: Mar. 15, 2022

(54) METHOD FOR CONTROLLING AN AIRCRAFT, AND AN AIRCRAFT (VARIANTS)

(71) Applicant: UAVOS Holdings Limited, Hong Kong (HK)

(72) Inventors: Tsimafei Batura, Minsk (BY); Yury Tytsyk, Minsk (BY); Aliaksei Stratsilatau, Minsk (BY); Viachaslau Shpileuski, Minsk (BY)

(73) Assignee: UAVOS HOLDINGS LIMITED, Hong Kong (HK)

( * ) Notice: Subject to any disclaimer, the term of this patent is extended or adjusted under 35 U.S.C. 154(b) by 324 days.

(21) Appl. No.: 16/133,227

(22) Filed: Sep. 17, 2018

(65) Prior Publication Data
US 2020/0086972 A1    Mar. 19, 2020

(51) Int. Cl.
*B64C 3/38* (2006.01)
*B64C 3/52* (2006.01)
*B64C 39/04* (2006.01)

(52) U.S. Cl.
CPC .............. *B64C 3/385* (2013.01); *B64C 3/52* (2013.01); *B64C 39/04* (2013.01)

(58) Field of Classification Search
CPC ........... B64C 3/385; B64C 3/52; B64C 39/04; B64C 39/08; B64C 39/10; B64C 2201/042; B64C 3/38; Y02T 50/10
See application file for complete search history.

(56) References Cited

U.S. PATENT DOCUMENTS

| | | | | |
|---|---|---|---|---|
| 1,259,083 A * | 3/1918 | Covino | ................... | B64C 39/08 244/13 |
| 2,063,030 A * | 12/1936 | Crouch | ................... | B64C 3/385 244/7 C |
| 5,769,359 A * | 6/1998 | Rutan | ................... | B64C 3/385 244/120 |
| 8,333,348 B1 * | 12/2012 | Miller | ................... | B64C 13/16 244/199.4 |
| 2008/0001028 A1 * | 1/2008 | Kendall | ................... | B64C 3/52 244/75.1 |
| 2010/0213309 A1 * | 8/2010 | Parks | ................... | B64C 3/16 244/46 |
| 2011/0038727 A1 | 2/2011 | Vos et al. | | |
| 2017/0349266 A1 * | 12/2017 | Krebs | ................... | B64C 13/18 |
| 2019/0077497 A1 * | 3/2019 | Uhlig | ................... | B64D 27/24 |

FOREIGN PATENT DOCUMENTS

GB          172980          3/1922

OTHER PUBLICATIONS

You Tube clip: www.youtube.com/watch?v=qQbUjaQ94xO; "The X-HALE Expermential High Altitude Long Endurance Aircraft", Michigan Engineering, U. of Michigan, published Feb. 12, 2018.

* cited by examiner

*Primary Examiner* — Medhat Badawi
*Assistant Examiner* — Vicente Rodriguez
(74) *Attorney, Agent, or Firm* — Nath, Goldberg & Meyer; Jerald L. Meyer (57) ABSTRACT

A multi-boom aircraft with an adjustable wing geometric twist includes at least one wing, and at least three booms arranged transversely to at least one of the wings. Each of the booms includes at least one actuator, and the at least one wing is mounted on the booms so as at least a portion of the corresponding wing can be pivoted by means of the actuators about an axis extending substantially along the corresponding wing.

10 Claims, 11 Drawing Sheets

METHOD FOR CONTROLLING AN AIRCRAFT, AND AN AIRCRAFT (VARIANTS)

FIELD OF THE INVENTION

The present invention relates to methods for controlling a multi-boom aircraft which uses a wing to generate a lift, to methods of changing a wing geometric twist of such aircraft, and to a design of such aircraft.

PRIOR ART

One of the critical parameters of an aircraft is the lift-to-drag ratio, that is, the amount of lift generated by a wing, divided by the drag it creates at a given angle of attack. The lift-to-drag ratio has an impact on aircraft performances, such as gliding range, flight range, and endurance, fuel consumption, climbing performances, etc.

The more the wing aspect ratio is, the more the lift-to-drag ratio increases. Thus, the lift-to-drag ratio of an aircraft, and therefore aircraft performances, can be increased by increasing the wing aspect ratio as much as possible.

The wing aspect ratio has the main role for the use of an aircraft as so-called atmospheric satellites, (atmosat, pseudo-satellite). These are high-altitude aircrafts with a long flight endurance (High-Altitude Long Endurance, HALE). It is expected that atmospheric satellites will be suitable for tasks such as collecting meteorological data, communication (repeaters), mapping, defense tasks, etc. To perform those tasks, the atmospheric satellites must be in flight for at least several weeks, preferably several months or even years.

Currently, the atmospheric satellites are expected to be powered by solar panels. The larger the surface areas of an aircraft on which solar panels can be mounted, the more energy the aircraft receives and the longer time the aircraft performs the assigned functions. The energy produced during availability of solar radiation is used by an aircraft, firstly, to power motors, a control system, and payload, and, secondly, to accumulate energy in so-called buffer batteries. The aircraft can then use the energy accumulated in the buffer batteries when the solar radiation is unavailable. To save the energy during periods when the solar radiation is unavailable, an atmospheric satellite can activate a gliding mode (with engines turned-off) where the energy will be consumed only for the control system and payload (sensors, repeaters, etc.) operation.

That is why a high wing aspect ratio for atmospheric satellites, firstly, provides the best possible lift-to-drag ratio, and secondly, allows making a wing of a large surface area in order to mount thereon as many solar panels (photovoltaic panels) as possible.

When in operation, the aircraft wing is exposed to loads and experiences bending and torsion deformations. In accordance with a classical aerodynamic arrangement, when the mass is focused in the center and bearing surfaces are arranged symmetrically, a bending moment is taken by a load-bearing element—a spar—extending along the entire length of the wing. A skin protects the wing from torsion deformations. As the weight of an aircraft made in accordance with the classical aerodynamic arrangement increases in proportion to the third power of linear dimensions, at a certain threshold value of the wing aspect ratio the aircraft is destructed.

In the 1920's a solution was suggested which, in theory, made it possible to increase the wing aspect ratio up to any desired value. In his patent GB172980, the inventor suggested the configuration of the giant aircraft having the wing with the super high wing aspect ratio which was connected to multiple fuselages. All loads of such aircraft, including the aircraft empty weight, the weight of carried goods and the weight of all engines, was, supposedly, distributed more evenly along the wingspan so that in flight the load acting on the wing is evenly distributed along the wingspan. Elevators are arranged at fuselage ends. Engine propellers, like the elevators, were supposed to be arranged either forward, or backward of the wing, or in an alternating manner. In the result, the aircraft represented a plurality of aircrafts mechanically interconnected by rigid bonds. According to the inventor, such arrangement minimized bending and torsion deformations and provided the desired wing aspect ratio. However, if the wing of such aircraft is rigid, in-flight loads produced by aerodynamic disturbance can provoke destruction of the aircraft.

In order to address the problem of destruction of an aircraft due to the exceeded threshold of acceptable deformations it was suggested to use adaptive flexible bearing surfaces (morphing structures) such as disclosed, for instance, in US20110038727. It was expected that such wings could be adaptively morphed in response to the environmental conditions. Such wings comprised driven movable frame components and/or resilient composite materials. The drawback of this configuration is an insufficient strength of materials to be used and complexity of manufacturing and control.

It is known that a spatial attitude of any aircraft is determined by three angular coordinates: a roll (a turn of an aircraft about a longitudinal axis thereof), a pitch (a turn of an aircraft about a transverse axis thereof), a yaw (a turn of an aircraft about a vertical axis thereof).

Usually, for yaw control (course control) a rudder is used which is a surface rotatable about a vertical axis thereof. The rudder is typically mounted on a stabilizer backward of the wings.

Usually, for roll control, surfaces (ailerons) rotatable about a horizontal axis thereof are used. Typically, ailerons are mounted symmetrically at a trailing edge of the wing panels.

Commonly, for pitch control, elevators are used which are surfaces rotatable about a horizontal axis thereof. An elevator for an aircraft made in accordance with the classical aerodynamic arrangement is arranged on a trailing edge of a stabilizer and is a component of a tail. In a canard aircraft, the elevator is a component of a horizontal canard. In a tailless aircraft or a flying-wing aircraft, the elevators are combined with ailerons (so-called elevons) and are arranged on a trailing edge of wing panels.

Another important parameter of an aircraft is a V-shape of a wing (dihedral, anhedral) which impacts, amongst other, dihedral stability of the aircraft.

Conventionally, the aircraft structure is made as rigid and robust as possible so that structural shape remains unchanged under external loads. Movable controls are pivotally mounted to fixed structural components. In particular, a geometric wing twist, i.e., the change of an angle of incidence along the wing, and the V-shape are set at the aircraft design stage and remain constant in flight.

It is known the atmospheric satellite X-HALE (see, for instance, the link www.youtube.com/watch?v=qQbUJaQ94x0, access date Jul. 25, 2018) with a flexible wing and made with multiple booms. The wing of this aircraft is fitted with sensors monitoring flight parameters to scan changes of in-use aerodynamic parameters of the aircraft.

Said X-HALE atmospheric satellite is taken as a prototype for the claimed invention.

SUMMARY OF THE INVENTION

The device and method according to the present invention are further development of the prototype mentioned above and aimed to address known disadvantages thereof and other known technical solutions.

The essence of the present invention is as follows.

Firstly, it is claimed a multi-boom aircraft configured to change a wing geometric twist and comprising at least one wing, at least three booms arranged transversely to at least one of the wings, wherein each of the booms includes at least one actuator, and said at least one wing is mounted on said booms so as to at least a portion of the corresponding wing can be pivoted by actuators about an axis extending substantially along the corresponding wing.

Secondly, it is claimed a system for controlling the wing geometric twist of such aircraft which comprises a wing shape optimization module, means for measuring deformations of the at least one wing, an analytical module, and an actuating module.

Thirdly, it is claimed a method for controlling the wing geometric twist of at least one of the wings of such aircraft by means of said system for controlling the wing geometric twist, which comprises the following steps:

(i) determining, by the wing shape optimization module, an optimal shape of the at least one wing depending on current flight conditions and a flight mission, (ii) obtaining, by the means for measuring deformations of the at least one wing, current values of deformations of the corresponding wing, (iii) sending the obtained current values of deformations of the corresponding wing to the analytical module, (iv) determining, by the analytical module, a current shape of the corresponding wing, (v) comparing, by the analytical module, the current shape of the corresponding wing with a previously determined optimal shape of the corresponding wing, and if the current shape of the corresponding wing is different from said optimal shape of the corresponding wing, activate, by the actuating module, the at least one actuator to pivot at least a portion of the at least one of said wings so that a resultant change of the wing geometric twist of the at least corresponding wing leads to a redistribution of an angle of attack of at least a portion of the at least corresponding wing such that, due to a redistribution of aerodynamic forces, the wing with the current shape of the wing tends to achieve the optimal shape thereof.

Fourthly, it is claimed a multiple boom aircraft configured to change a wing geometric twist and comprising a wing, at least three booms arranged transversely to the wing, each of the booms is equipped with a horizontal stabilizer with an elevator. The wing is rigidly connected to said booms at a point of connection of each of said booms to the wing. Each of the elevators is configured to change its position independently from other elevators in order to change a force transmitted from the corresponding boom at the point of connection of the boom to the wing, substantially independently from the other booms.

Fifthly, it is claimed a system for controlling the wing geometric twist of such aircraft, comprising a wing shape optimization module, means for measuring deformations of at least one wing, an analytical module, and an actuating module.

Sixthly, it is claimed a method for controlling the wing geometric twist of such aircraft by means of said system for controlling the wing geometric twist, which comprises the following steps:

(i) determining, by the wing shape optimization module, an optimal shape of the at least one wing depending on current flight conditions and a flight mission, (ii) obtaining, by the means for measuring deformations of the at least one wing, current values of deformations of the corresponding wing, (iii) sending the obtained current values of deformations of the corresponding wing to the analytical module, (iv) determining, by the analytical module, a current shape of the corresponding wing, (v) comparing, by the analytical module, the current shape of the corresponding wing with a previously determined optimal shape of the corresponding wing, and if the current shape of the corresponding wing is different from said optimal shape of the corresponding wing, activate, by the actuating module, the at least one elevator of a horizontal stabilizer to change a force transmitted by the boom equipped with said horizontal stabilizer to the wing at the point of connection of said boom to the wing, and to change respectively the wing geometric twist of at least a portion of the wing so that a resultant change of the wing geometric twist of the entire wing leads to a redistribution of an angle of attack of said at least the portion of the wing such that, due to redistribution of aerodynamic forces, the wing with the current shape of the wing tends to achieve the optimal shape thereof.

The preferred but not limiting embodiments of the present invention will be described further in detail with references to the drawings.

BRIEF DESCRIPTION OF THE DRAWINGS

For the sake of easier appearance for a reader and better understanding of the present invention, the wing and the booms (the fuselages) of the aircraft are shown in the figures schematically.

DETAILED DESCRIPTION OF THE INVENTION

First embodiment of the present invention.

Figure 1:
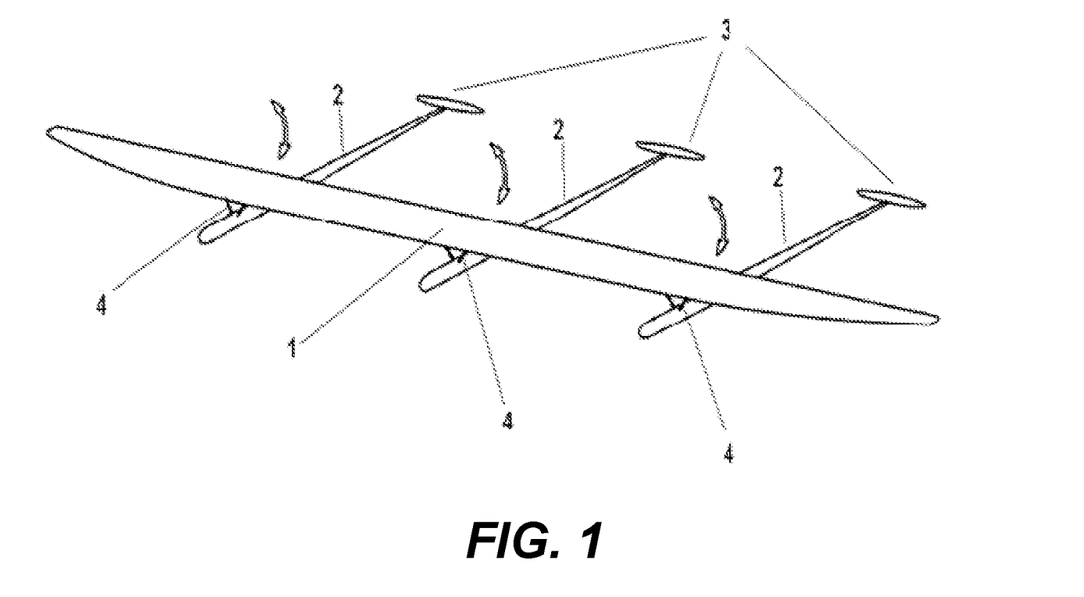
FIG. 1 represents a first preferred embodiment of the aircraft according to the present invention.

FIG. 1 shows one of the preferred embodiments of the invention. Here, a wing (1) is connected to booms (2), or fuselages, arranged transversely to the wing (1). In accordance with this embodiment of the invention, a horizontal tail (3) including a fixed stabilizer is mounted on each of the booms (2).

The wing (1) is connected to the booms (2) and configured to be pivotal, by means of actuators (4), with at least a portion thereof about an axis extending along a line of a span of the wing (1). Possible pivoting directions are shown in FIG. 1 by arrows. The actuators (4) are mounted on the booms (2) and can be brought into action by servomotors or other drivers well known to one skilled in the art.

The optimal number of the booms (2) is at least three, whereas the wing (1) is connected to each of the booms (2) by means of the corresponding actuator (4). The actuators (4) are made such that they can be operated independently from each other when pivoting a certain portion of the wing (1) independently from other portions of the wing (1). Therefore, at least one portion of the wing (1) can be pivoted about the horizontal axis, while the other portions thereof, in particular, the portions distant from said at least one portion, can remain substantially or nearly stationary.

A large aspect ratio renders the wing (1) sufficiently flexible and capable to support bending and torsion deformations, i.e., to support the change in distribution of a wing geometric twist along the wing (1) within a high range without destruction.

Since the wing (1) has sufficient elasticity, the deformation caused by rotation of the wing (1) at the point of action of the actuator (4) extends further along the wing (1) to zones (areas, portions) adjacent to the point of action of the actuator (4). In the result, the wing geometric twist, namely a geometric twist distribution along the wing (1), will be changed. The controllable change of the wing geometric twist will cause a controllable distribution of the angle of attack along the wing (1). The controllable change of the angle of attack (the controllable change of the geometric twist) causes redistribution of aerodynamic forces acting on the aircraft. Therefore, it becomes possible to neutralize, or compensate, in-flight deformations caused by external conditions (actions), as well as to control a spatial attitude of the aircraft.

Second embodiment of the present invention.

Figure 2:
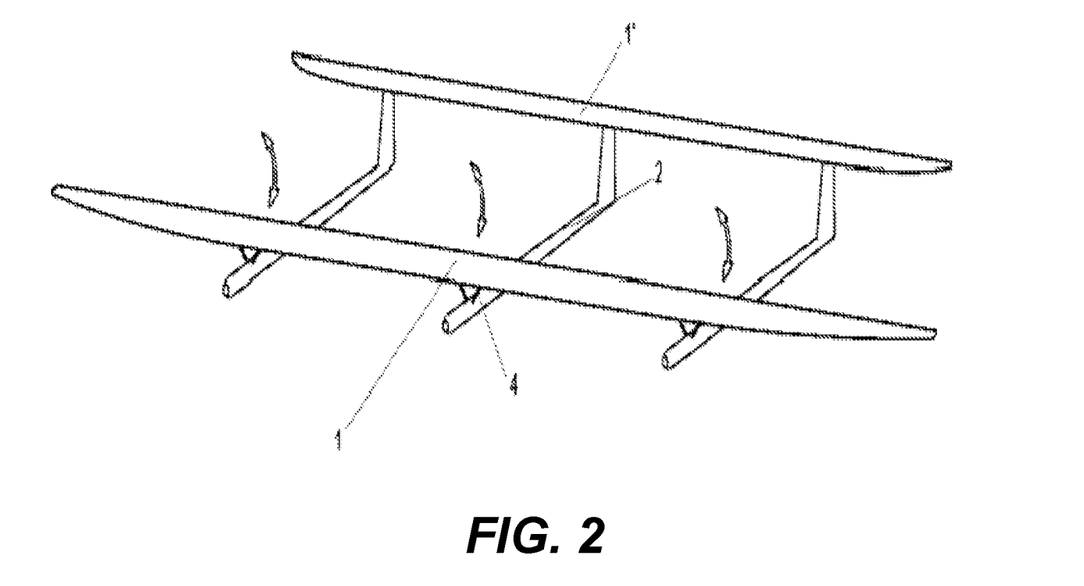
FIG. 2 represents a second preferred embodiment of the aircraft according to the present invention.

FIG. 2 shows another preferred embodiment of the invention. Here, dimensions of a horizontal tail surface are such that this surface can be mounted on all booms (2) at once and this surface substantially is a second wing (1') arranged backward of and parallel to a first wing (1). In this way, a tandem arrangement of the aircraft is formed. The second wing (1') can be exactly the same as the first wing (1) or can have dimensions, profile, etc. different from those of the first wing (1).

The advantage of the tandem arrangement in comparison with the first embodiment of the invention is in an improved structural rigidity. Severe external impacts on one of the wings (1, 1') caused by elastic nature of structural components will be extended to the second one of the wings (1, 1'). The aircraft will be more resistant to destructive external actions. This is why at a given design strength, the rigidity requirements to each of the wings (1, 1') and, accordingly, to a weight of the wings (1, 1') can be reduced to some extent.

In an aircraft powered by solar panels, it is desired to increase as much as possible a surface area of the aircraft suitable for installation of the solar panels. Having a predetermined strength of the aircraft and a predetermined surface area of the solar panels, the specific weight of the tandem aircraft will be lower than that of a one-wing aircraft (a monoplane). Accordingly, payload weight of the tandem arrangement can be, too, higher than that of the aircraft according to the first embodiment.

Figure 2A:
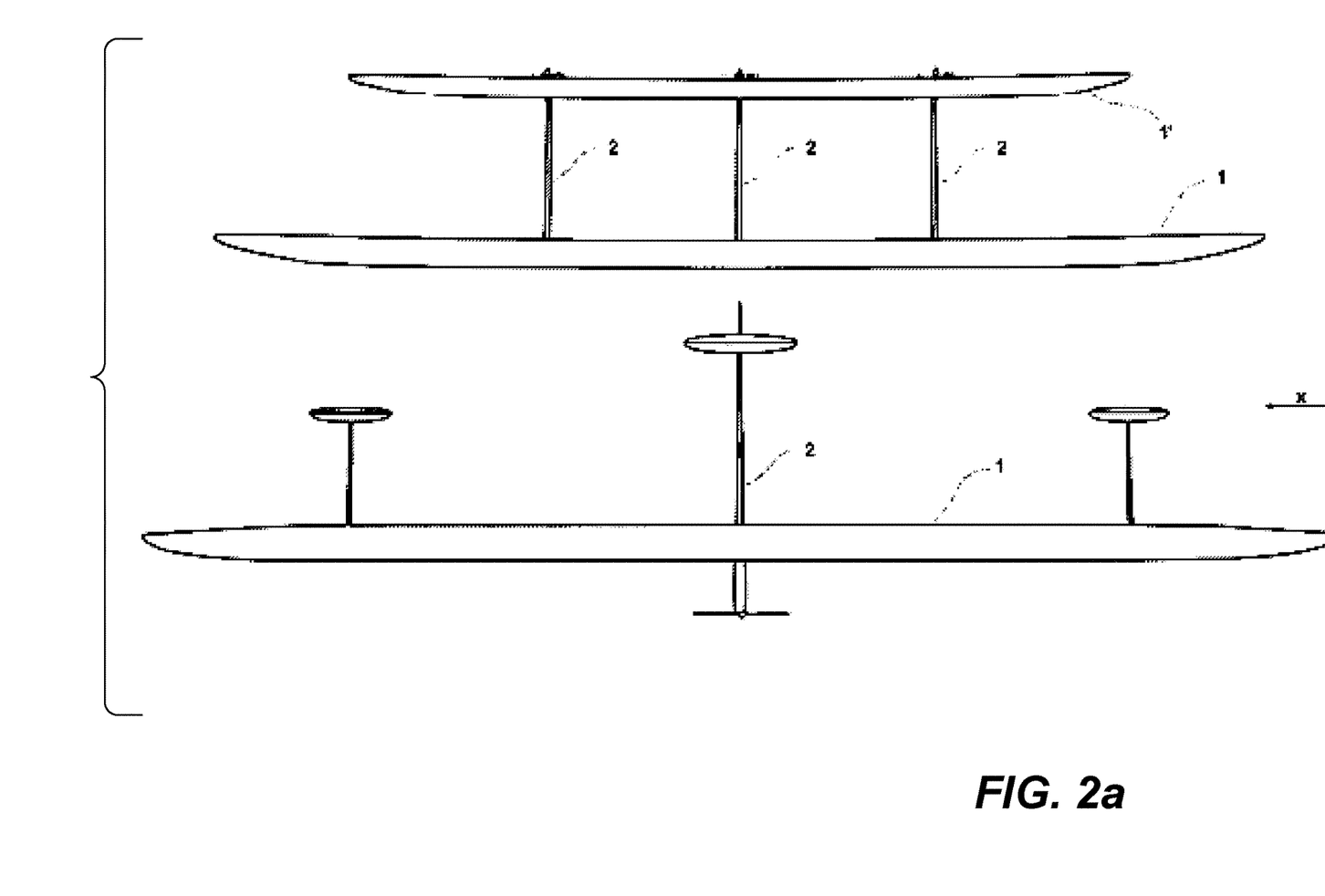
FIG. 2a is a schematic diagram representing a comparison between the first and the second embodiments of the aircraft in respect of the wingspan upon predetermined surface area.

Another advantage of the tandem aircraft is that with the predetermined surface area a wingspan of the tandem is lower than that of the one-wing aircraft. Hence, the tandem aircraft, other things being equal, can move around a circle of a smaller radius and possesses higher maneuverability compared to the one-wing aircraft, as depicted in FIG. 2a.

Figure 3A:
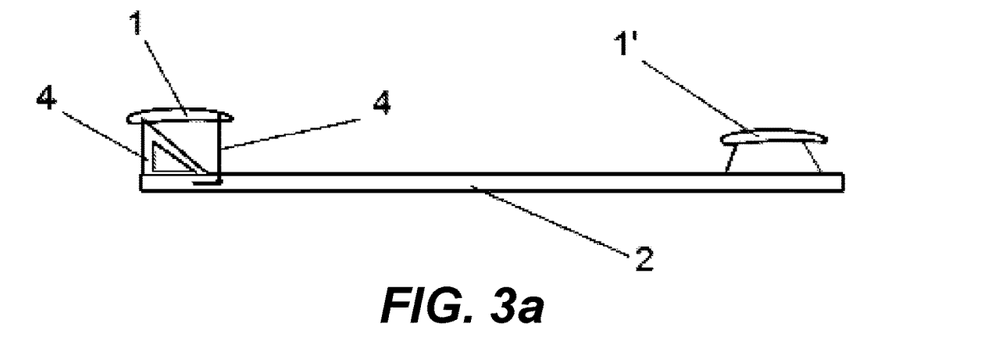
FIGS. 3a and 3b represent variants of the second embodiment of the aircraft according to the present invention.

The second wing (1') can be rigidly and non-pivotally connected to the booms (2), as shown in FIG. 3a.

Figure 3B:
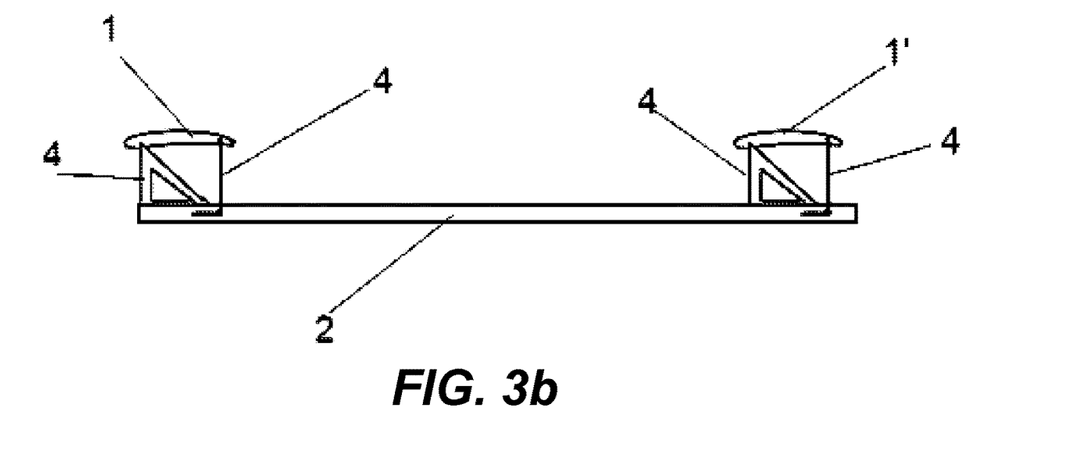

Alternatively, the second wing (1') can be connected to the booms (2) via the actuators (4) such as to change the angle of attack of the second wing (1') identically and synchronously for the entire second wing (1'). In this embodiment, a surface of the horizontal tail acts as a stabilizer or an elevator (FIG. 3b).

In addition, the second wing (1') can be fixed to the booms (2) similarly to the first wing (1). Namely, each of the booms (2) is connected to the second wing (1') by means of the actuators (4) which are configured to operate independently from one another by pivoting a certain portion of the wing (1') independently from other portions of the wing (1') about an axis extending substantially along the wing (1') (FIG. 3b).

Figure 4:
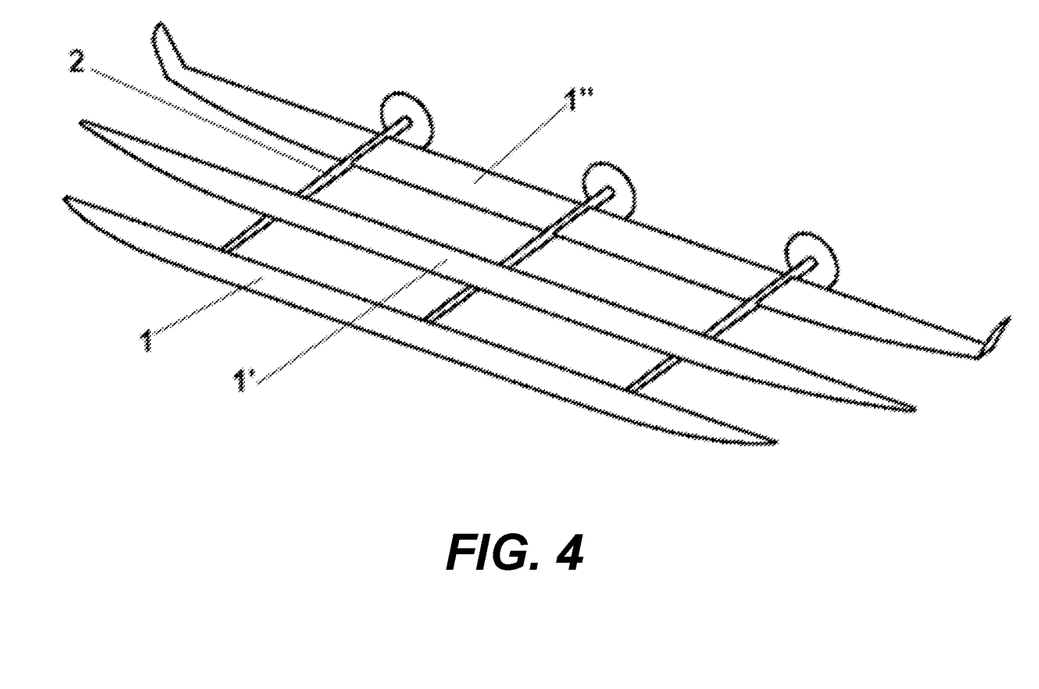
FIG. 4 represents another embodiment of the aircraft according to the present invention.

Generally speaking, following this method an aircraft can be provided with any number of wings (1, 1', 1" . . . ) configured to pivot independently with respect to each of the booms (2) about an axis extending along a line of wingspan (FIG. 4).

The wings (1, 1', 1" . . . ) having a large aspect ratio are made of high-strength structural materials. Such the wing can have any plane form suitable to achieve the objects of the invention. The wing can have a static wing geometric twist and/or aerodynamic wing twist, or it can have neither of them. Preferably, but not necessarily, weight of the wing should be evenly distributed over the wingspan. It is also preferable that the wing is made without any articulated joints, and when bending, deformation of the wing is extended over the entire wing in accordance with the elasticity of the wing.

In any of the embodiments of the aircraft according to the present invention, the booms (2), or fuselages, are used to arrange thereon engine-propeller combinations, a landing gear, payload, control system components, and so on. Moreover, according to possible embodiments of the invention, the booms (2) can receive a horizontal tail and/or a vertical tail, a fin and stabilizers.

Figure 5:
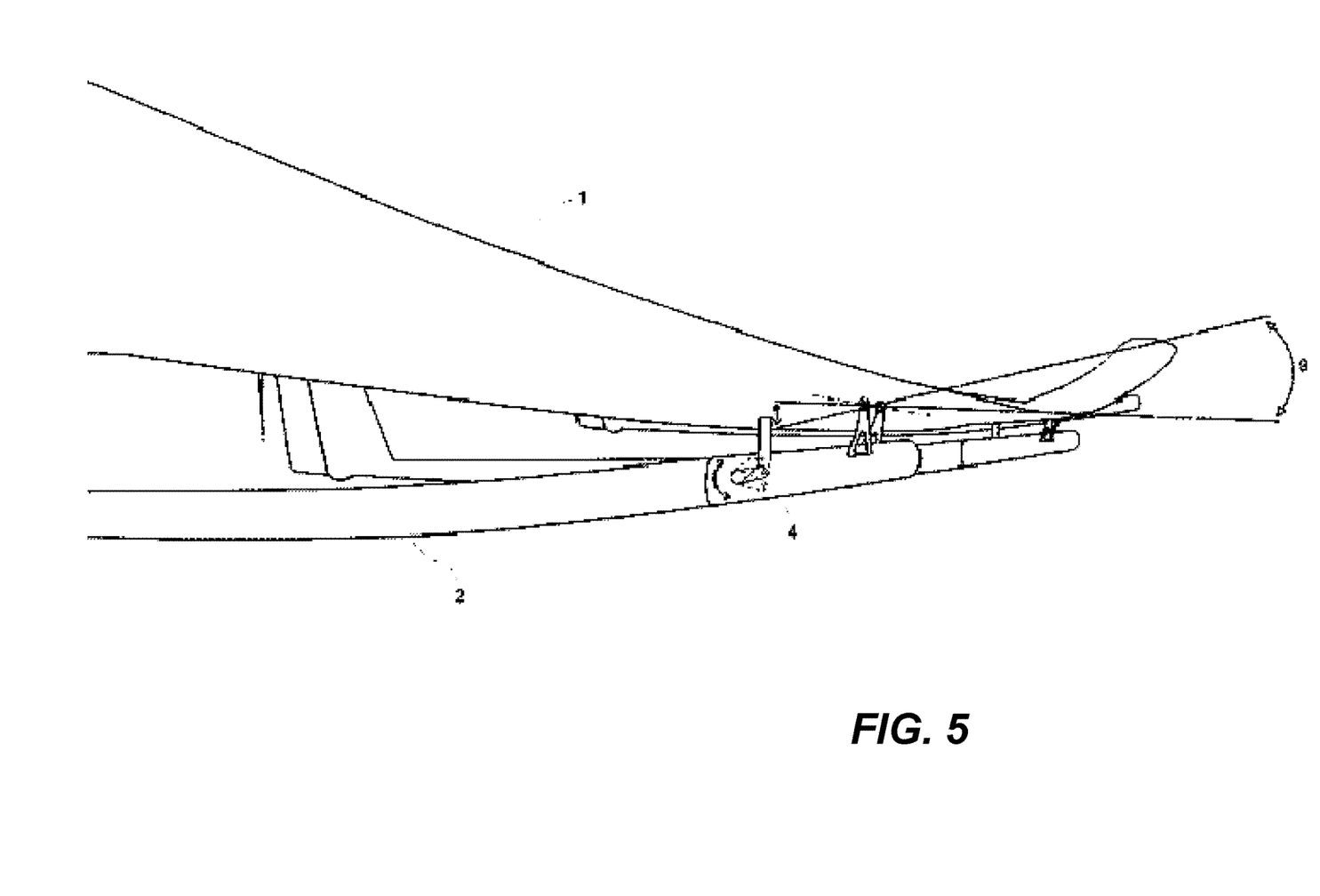
FIG. 5 schematically shows the actuator assembly.

Each actuator (4) is actuated by an individual drive unit to act independently from the other actuators (4). The actuators (4) can be lever-type actuators. The drive units can be electrical, hydraulic, or pneumatic. More preferably, the drive units are made in the form of servomotors. Specific embodiments of the drive units and actuators are well-known to one skilled in the art and do not represent an object of the present invention (see FIG. 5).

A power unit of the aircraft comprises at least one motor driving a propeller. In a gliding mode, propeller blades can be folded to reduce the aerodynamic drag. The power unit concepts and arrangement options are well known to one skilled in the art and do not represent an object of the present invention.

Any one of the described embodiments of the aircraft according to the present invention can be further equipped, upon designer's choice, with one or more rudders and/or spoilers mounted on panels of at least one of the wings (1, 1', 1" . . . ) to perform a yaw control (to change the yaw attitude). The configuration and arrangement options of rudders and/or spoilers are well-known to one skilled in the art and do not represent an object of the present invention.

A designer can decide to further equip the aircraft with spoilers arranged at tips of the at least one wing. Here, the spoilers act only as a speed brake and do not affect the lift.

The wing geometric twist and wing deformations are controlled by means of a system for controlling the wing geometric twist of the aircraft (FIG. 5), which comprises a wing shape optimization module, means for measuring deformations of the at least one wing, an analytical module, and an actuating module.

The wing shape optimization module is designed to define, at a given point in time, an optimal shape of the at least one wing of the aircraft based on current flight conditions, a flight mission and maximum allowed (threshold) deformations of the wing above which the aircraft will be destructed. The threshold deformations can occur, in particular, under the effect of external actions, e.g. when passing through a turbulence zone, upflows, strong wind, etc. In general, allowable deformations of the wing are defined by a configuration of the wing, and one skilled in the art will understand how to measure or calculate these values. In particular, the flight mission can require changing an attitude of the aircraft and roll angles, as well as a V-shape of the wing.

Figure 6:
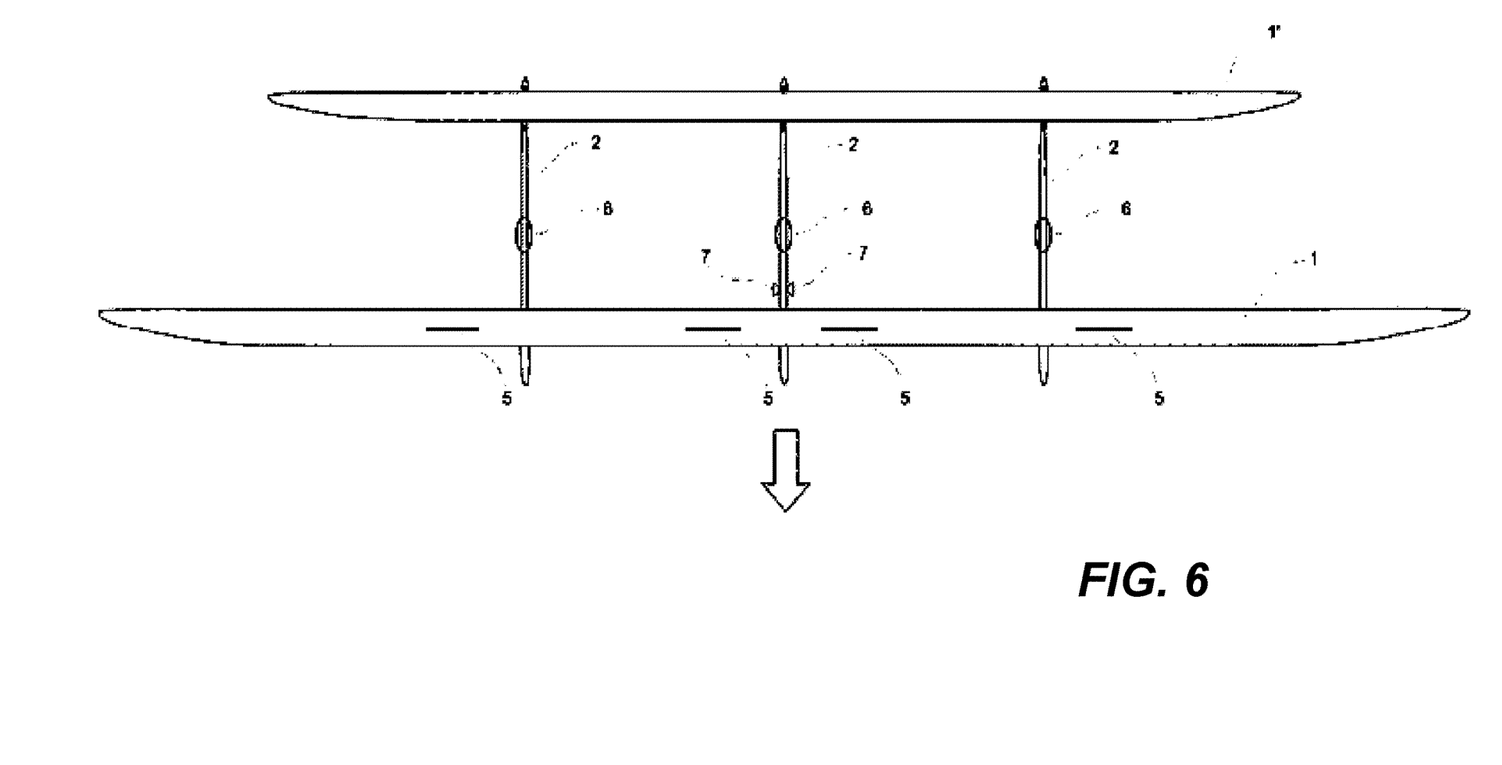
FIG. 6 shows the means for measuring deformations and their possible arrangement on the aircraft.

Referring to FIG. 6, the means for measuring deformations are deformation sensors. Said sensors can comprise inertial position sensors or attitude indicators (6), various strain sensors. One of the preferred variants of the deformation sensors includes fiber-optic strain sensors using a Bragg grating (5). The means for measuring deformations can include devices analyzing deformations by an optical mark. For instance, such the means can be video cameras (7) and specific marks disposed on the wing. However, generally a type of the strain sensor to be used is selected by a designer.

To provide maximum efficiency, the deformation sensors are installed on those sections of the wing where measurement values are maximal or expected to be maximal, for instance, in a zone of (expected) maximum deformation, a zone of (expected) maximum stresses, a zone of (expected) maximum displacements which can be predetermined by calculation or by trials.

Preferably, the system for controlling the wing geometric twist includes means for measuring deformations of at least two independent systems, or types. It is important primarily for ensuring fault tolerance in case of failure of the means for measuring deformations of any one type. However, depending on the task, a designer can utilize the means for measuring deformations of only one type, for instance, only strain sensors or only attitude indicators.

To enable a proper operation, it is required to collect the deformation data at a plurality of points of the corresponding wing, preferably at least at three points of the corresponding wing.

The means for measuring deformations are mounted on each of the wings connected to the booms (2), to independently pivot with respect to each of the booms (2) about the axis extending along the line of wingspan.

The analytical module is configured to receive deformation values determined by the means for measuring deformations; to determine a current shape of the at least one wing (1, 1', 1" . . . ) based on the received deformation values; to compare the current shape of the at least one wing (1, 1', 1" . . . ) with the optimal shape of this wing determined by the wing shape optimization module; if the current shape of the corresponding wing is different from the optimal shape of this wing, to send to the actuating module a command to bring into action the at least one actuator such that, due to redistribution of aerodynamic forces, the current shape of the wing will tend to achieve the optimal shape. Generally, the analytical module processes data from the means for measuring deformations installed on each of the wings (1, 1', 1" . . . ) connected to the booms (2) to independently pivot with respect to each of the booms (2) about the axis extending along the line of wingspan.

The actuating module is configured to bring the actuators into action.

Hereinafter, for the sake of simplicity each of the wings (1, 1', 1" . . . ) can be conditionally divided into several parts: one half of the wing and another half of the wing; or a left wing portion, a central wing portion, and a right wing portion.

Varying the relationship of geometric twist angles at different portions of the wing enables controlling the aircraft and changing or maintaining a given deflection or shape of the wing.

The pitch angle can be changed by changing the wing geometric twist all over the wingspan so that the angle of attack of the wing at each point of the wing along the wingspan is increased with respect to the initial angle of attack, or so that the angle of attack of the wing at each point of the wing along the wingspan is decreased with respect to the initial angle of attack.

The roll angle can be changed by changing the wing geometric twist so that the angle of attack of one half of the wing is decreased with respect to the initial angle of attack, or so that the angle of attack of said one half is increased with respect to the initial angle of attack. The minimum number of controlled sections (portions) of the wing for this task is two.

To control the V-shape of the wing, the wing geometric twist is changed so that the angle of attack of the right wing portion and the angle of attack of the left wing portion are changed with respect to the angle of attack of the central wing portion. For instance, to decrease the V-shape of the wing, the angle of attack of the right wing portion and the angle of attack of the left wing portion are decreased with respect to the angle of attack of the central wing portion; or to increase the V-shape of the wing, the angle of attack of the right wing portion and the angle of attack of the left wing portion are increased with respect to the angle of attack of the central wing portion. This control of the V-shape can be performed on the aircraft with at least three controlled wing sections (portions).

To control the distribution of the wing geometric twist of the multi-boom aircraft with the aim to neutralize in-flight deformations and aircraft's space position by the wing shape optimization, the following steps are carried out (FIG. 6):

(i) determining, by means of the wing shape optimization module, the optimal shape of the at least one wing depending on the current flight conditions and the flight mission, (ii) determining, by means of means for measuring deformations of the at least one wing, the current values of deformations of the corresponding wing, (iii) sending the obtained current values of deformations of the corresponding wing to the analytical module, (iv) determining the current shape of the corresponding wing by means of the analytical module, based on the received current deformation values for the corresponding wing, (v) comparing, by means of the analytical module, the current shape of the corresponding wing with the previously determined optimal shape of the corresponding wing, and if it is determined that the current shape of the corresponding wing is different from said optimal shape of the corresponding wing, at least one actuator is brought into action by means of the actuating module to pivot at least a portion of at least one of said wings so that the resultant change of the wing geometric twist of the at least corresponding wing leads to the redistribution of the angle of attack of at least a portion of the at least corresponding wing such that, due to redistribution of aerodynamic forces, the wing with the current shape of the wing tends to achieve the optimal shape.

If the flight mission includes roll changing, in step (v) at least a portion of at least one of said wings is pivoted so as the angle of attack of one half of the wing is increased with respect to the initial angle of attack, or so as the angle of attack of one half of the wing is decreased with respect to an initial angle of attack.

If the flight mission includes bank changing, in step (v) at least a portion of at least one of said wings is pivoted so as the angle of attack of one half of the wing is increased with respect to the initial angle of attack, or so as the angle of attack of one half of the wing is decreased with respect to an initial angle of attack.

If the flight mission includes changing the wing V-shape, in step (v) at least a portion of at least one of said wings is pivoted so as the angle of attack of the left portion of the corresponding wing and the angle of attack of the right portion of the corresponding wing are increased with respect to the angle of attack of the central portion of the corresponding wing, or so as the angle of attack of the left portion of the corresponding wing and the angle of attack of the right portion of the corresponding wing are decreased with respect to the angle of attack of the central portion of the corresponding wing.

The deformation data of each of the wings are collected and analyzed at a predetermined time interval. A designer establishes a frequency at which the deformation data of each of the wings are collected and at which the control system analyzes these data and controls the actuators. It is desirable to constantly monitor the wing deformation, and the time interval between two consecutive measurements of the wing deformation is defined based only on technical characteristics of means, sensors, connections etc. included into the system for controlling the wing geometric twist.

Generally speaking, the method for piloting the aircraft can be adapted not only to the multi-boom aircraft but to other known aircraft arrangements as well, such as "canard", "tridem" (an aircraft with three wings arranged in parallel to each other), etc.

In general, the means for measuring deformations can be installed on any number of the wings. It is a designer who decides to apply or not this approach taking into account specific operating conditions of the aircraft. It is practical to install the means for measuring deformations only on one, the biggest wing; however, other options are possible, too.

In addition, it is practical and in general sufficient to connect only one wing to the booms (2) pivotally with respect to each of the booms (2) about the axis extending along the line of wingspan. In this case, the other wings are recommended to be rigidly connected to the booms (2). However, other options are possible, too.

In practice, the best-controlled embodiments of the invention are the following:
a multi-boom aircraft having only one wing, which wing is connected to booms (2) by means of actuators (4) to pivot independently with respect to each of the booms (2) about an axis extending along a line of wingspan, and each of the booms (2) is fitted with a horizontal tail which is an elevator-less stabilizer (FIG. 2),
a multi-boom aircraft in the tandem arrangement having a front wing and a rear wing, where the front wing is connected to booms (2) by means of actuators (4) to pivot independently with respect to each of the booms (2) about an axis extending along a line of wingspan, and the rear wing is rigidly fixed, wherein the front wing is larger than the rear wing (FIG. 3).

In said two best-controlled embodiments, the wing with the controlled geometric twist substantially immediately changes an aerodynamic force as the result of execution of a command from the system for controlling the wing geometric twist, and, when entering and exiting a turn, generates a yawn rotation moment in the desired direction based on the difference between aerodynamic resistances of the panels (end portions of the wing). This reduces the need to steer with the rudders and reduces the losses.

Figure 7:
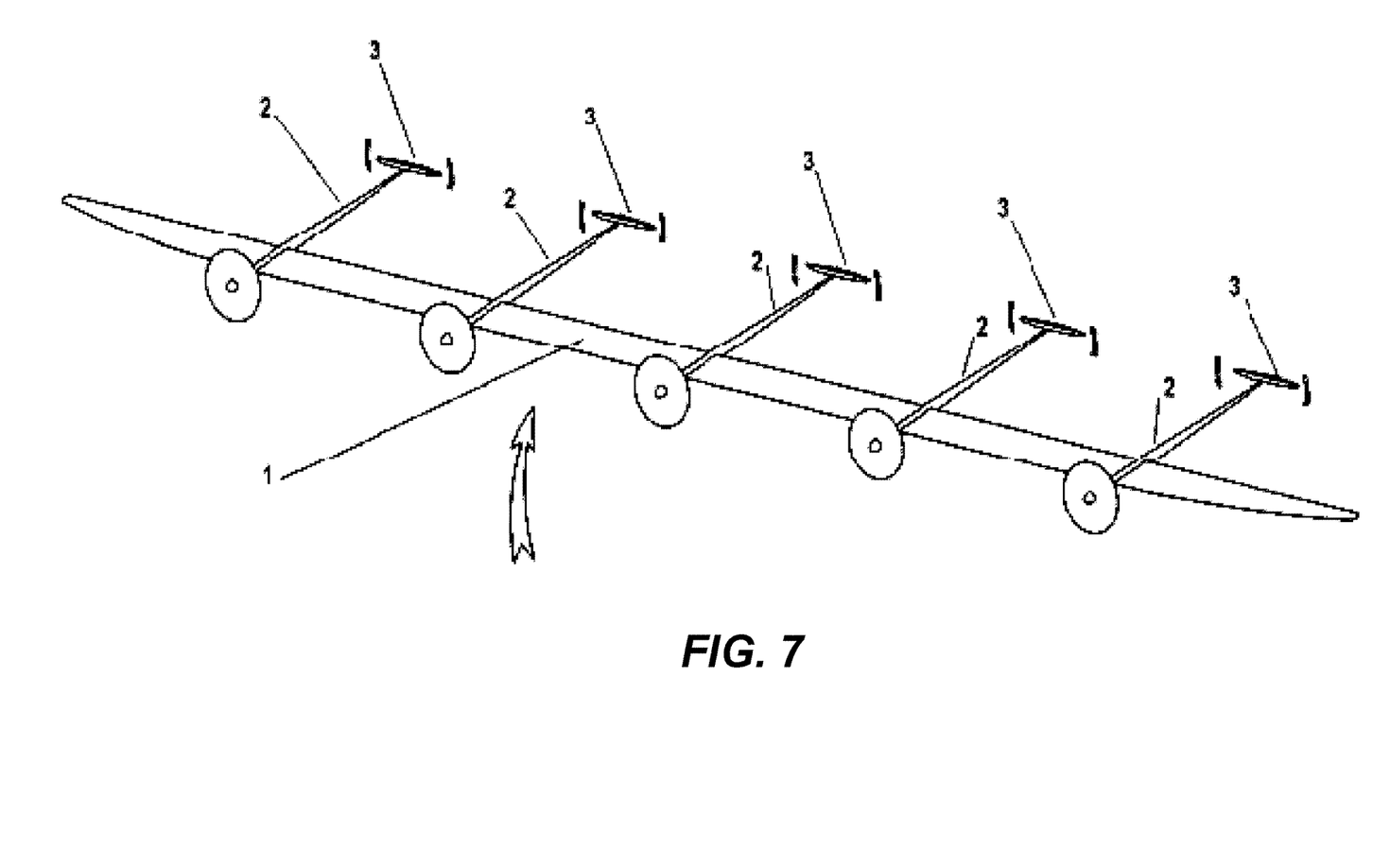

FIG. 7 is a schematic representation of another embodiment of the aircraft according to the present invention. In contrast to the described above embodiments, in this embodiment a wing (1) with a higher aspect ratio is rigidly mounted on booms (2), and each boom (2) has a horizontal tail (3) with elevators which makes it possible to adjust an altitude by means of the elevators. When changing a position of the horizontal tail (3), in particular, by controlling a position of each of the elevators, a respective control force is transferred through the corresponding boom (2) to a portion of the wing (1) which is rigidly connected to this boom (2). A deformation generated in this portion of the wing (1) tends to change an angle of attack of the entire wing (1) which happens because this deformation, due to flexible and elastic nature of the wing (1), extends further along the wing (1) to zones (areas) adjacent to this particular point of connection of the wing (1) to the corresponding boom (2), i.e., to the given portion of the wing (1). Consequently, the wing geometric twist, namely the distribution of the geometric twist along the wing (1), and, accordingly, the distribution of the angle of attack along the wing (1) will be changed.

Similarly to the described above embodiments, in the aircraft shown in FIG. 7 the wing geometric twist and wing deformations are controlled by means of a system for controlling the wing geometric twist of the aircraft (FIG. 8), which comprises a wing shape optimization module, means for measuring deformations of at least one wing, an analytical module, and an actuating module.

The wing shape optimization module is designed to define, at a given point in time, an optimal shape of a wing of the aircraft based on current flight conditions, a flight mission and maximum allowed (threshold) wing deformations, above which the aircraft will be destructed. In particular, the flight mission can require to change an aircraft attitude and roll angles, as well as a wing V-shape.

The means for measuring deformations are deformation sensors, e.g. inertial position sensors, or attitude indicators, various strain sensors, fiber-optic strain sensors using a Bragg grating etc. The means for measuring deformations can include devices that analyze deformations using an optical mark, e.g. video cameras and specific marks on the wing. Similarly to the embodiments described above, the type of the strain sensor is selected by a designer. The strain sensors are installed on those sections (portions) of the wing where measurement values are expected to be maximal, for instance, in a zone of possible maximum deformation, a zone of (expected) maximum stresses, a zone of (expected) maximum displacements. To ensure system fault tolerance, it is preferable that the system for controlling the wing geometric twist includes the means for measuring deformations of at least two independent systems or types.

To enable a proper operation, it is preferable to collect the deformation data at least at three points of the corresponding wing.

The analytical module is configured to receive deformation values determined by the means for measuring deformations; to determine a current shape of the wing (1) based on the received deformation values; to compare the current shape of the wing (1) with an optimal shape of this wing determined by the wing shape optimization module; if the current shape of the wing is different from the optimal shape of this wing, to send to an actuating module a command to bring into action at least one elevator such that, due to redistribution of aerodynamic forces, the wing with the current shape of the wing tends to achieve the optimal shape. Generally, the analytical module processes data from the means for measuring deformations installed on the wing (1) connected to the booms (2).

The actuating module is configured to bring into action each of the elevators of tails of the boom (2).

Similarly to the above disclosure made with reference to the first two embodiments of the aircraft according to the present invention, for the sake of simplicity and convenience in the third embodiment (FIG. 7) described hereinafter the wing (1) can be divided into several parts: one half of the wing and another half of the wing; or a left wing portion, a central wing portion, and a right wing portion.

Varying the relationship of the geometric twist angles of different portions of the wing enables controlling the aircraft and changing or maintaining a given wing deflection or shape.

Figure 11:
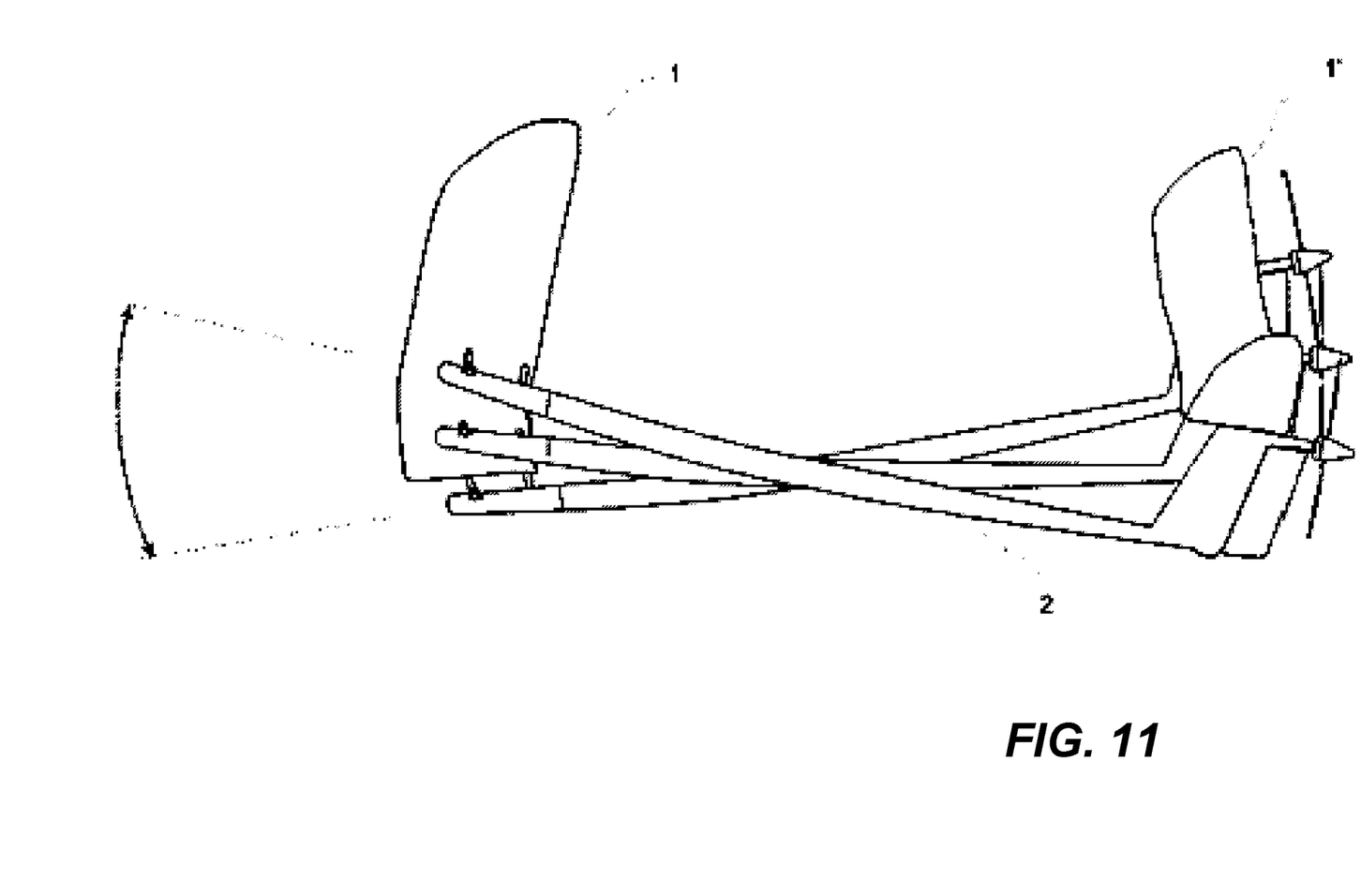
Figure 12:
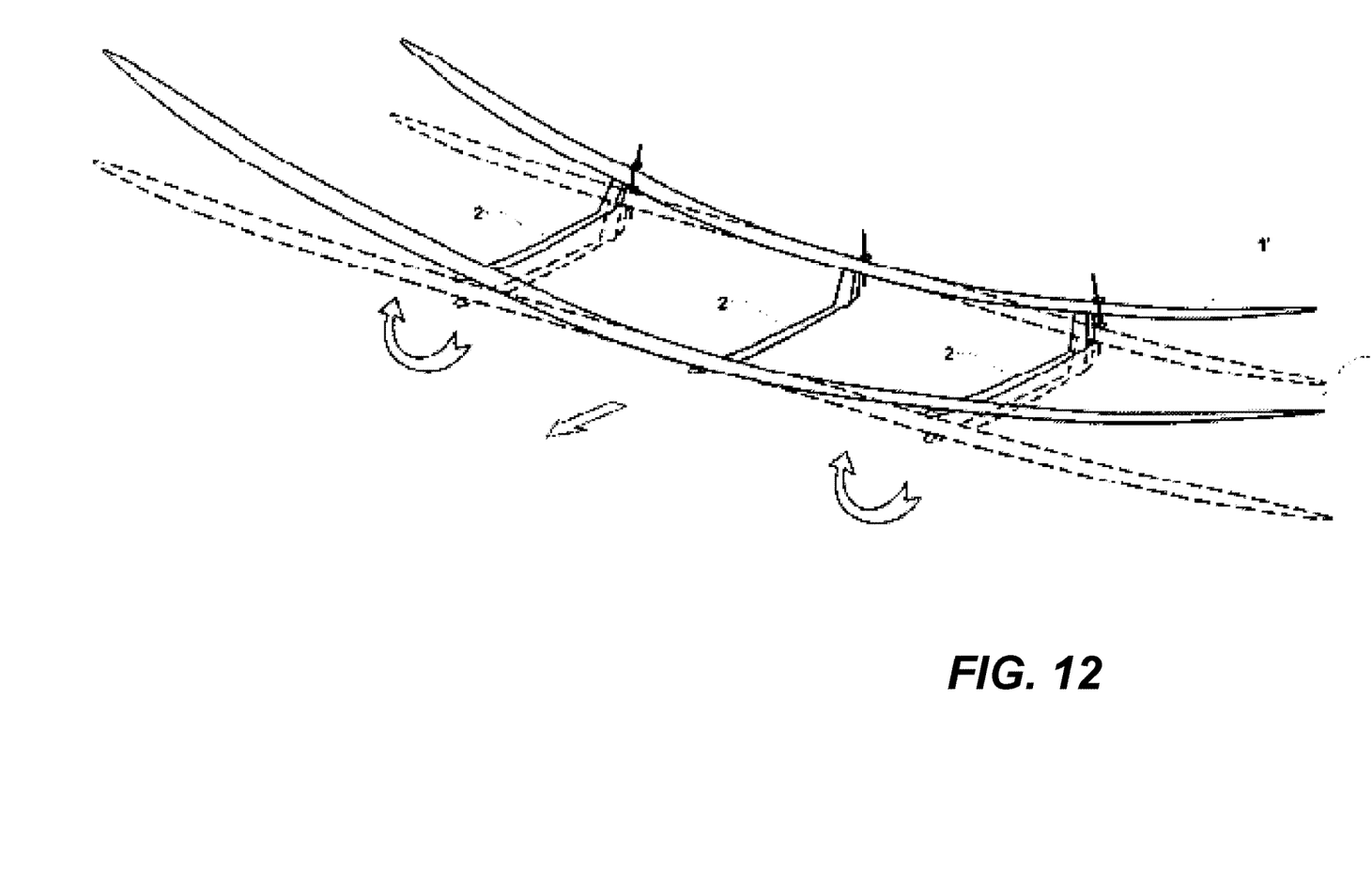

The control of the distribution of the wing geometric twist of a multi-boom aircraft with the aim to neutralize or compensate in-flight deformations and to control a spatial attitude of said aircraft by means of optimization of the wing shape is achieved by means of the following steps (FIG. 11):

(i) determining, by means of the wing shape optimization module, an optimal shape of the wing depending on current flight conditions and a flight mission, (ii) determining, by means of means for measuring deformations of the wing, current values of deformations of the corresponding wing, (iii) sending the obtained current values of deformations to the analytical module, (iv) determining a current shape of the wing by means of the analytical module based on the received current values of deformation for the wing, (v) comparing, by means of the analytical module, the current shape of the wing with the previously determined optimal shape of the wing, and if it is determined that the current shape of the wing is different from said optimal shape of the wing, at least one elevator is brought into action by means of the actuating module to change the force transmitted by means of the boom equipped with this elevator to the wing at a point of connection of this boom to the wing, and to change respectively the wing geometric twist of at least a portion of the wing so that the resultant change of the wing geometric twist of the entire wing leads to the redistribution of an angle of attack of at least a portion of the wing such that, due to redistribution of aerodynamic forces, wing with the current shape of the wing tends to achieve the optimal shape.

If the flight mission includes pitch changing, in step (v) at least one elevator is pivoted so as the resulted angle of attack along a wingspan is increased with respect to the initial angle of attack, or so as the resulted angle of attack along the wingspan is decreased with respect to the initial angle of attack (FIG. 7).

Figure 8:
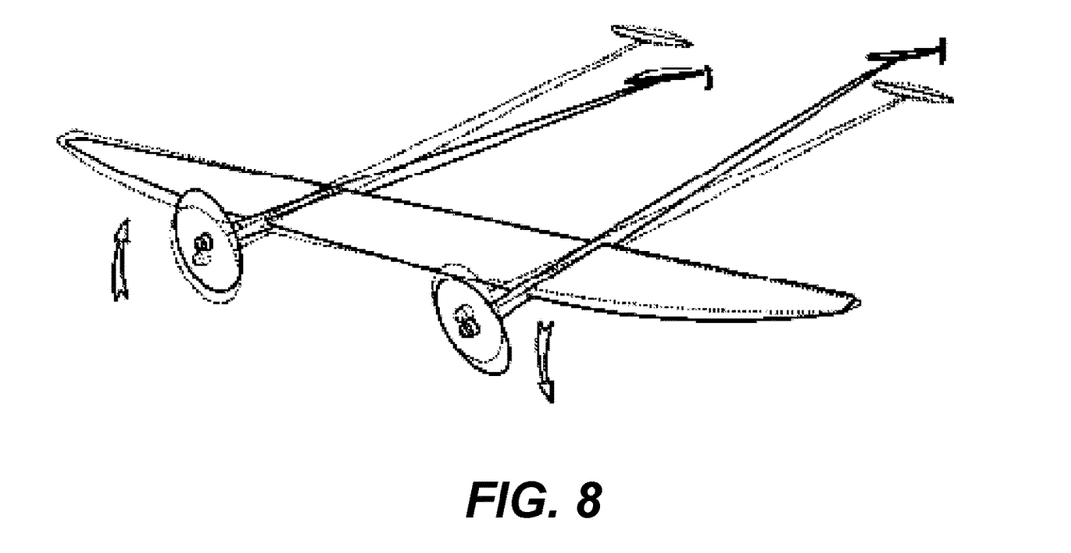
FIG. 8 represents the scheme for controlling an aircraft roll according to one of the embodiments of the aircraft.

If the flight mission includes roll changing, in step (v) at least a portion of one elevator is pivoted so as the angle of attack of one half of the wing is increased with respect to the initial angle of attack, or so as the angle of attack of one half of the wing is decreased with respect to an initial angle of attack (FIG. 8).

Figure 9:
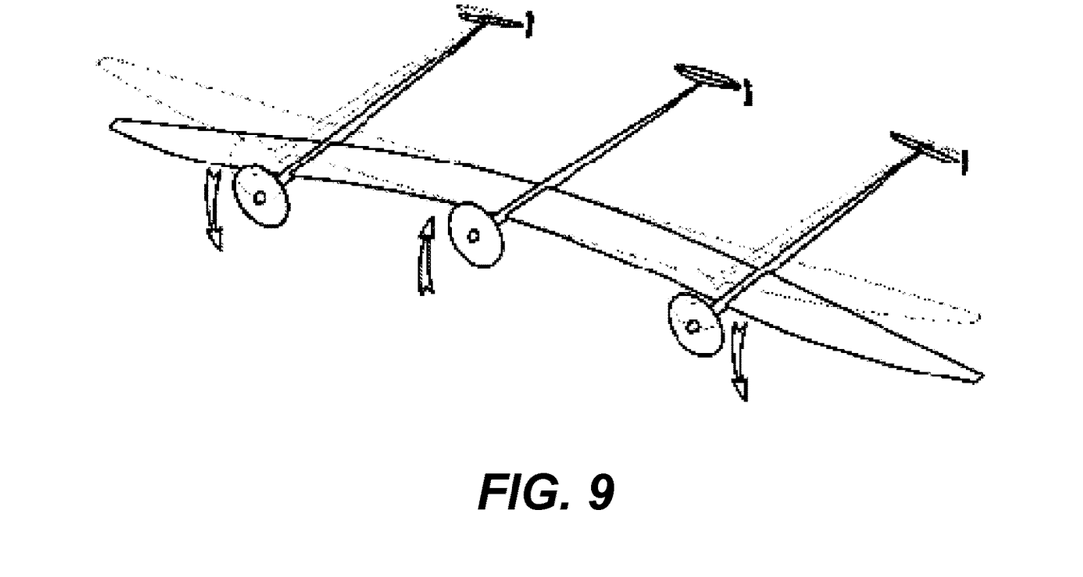
FIG. 9 represents the scheme for controlling an aircraft V-shape for one of the embodiments of the aircraft.
Figure 10:
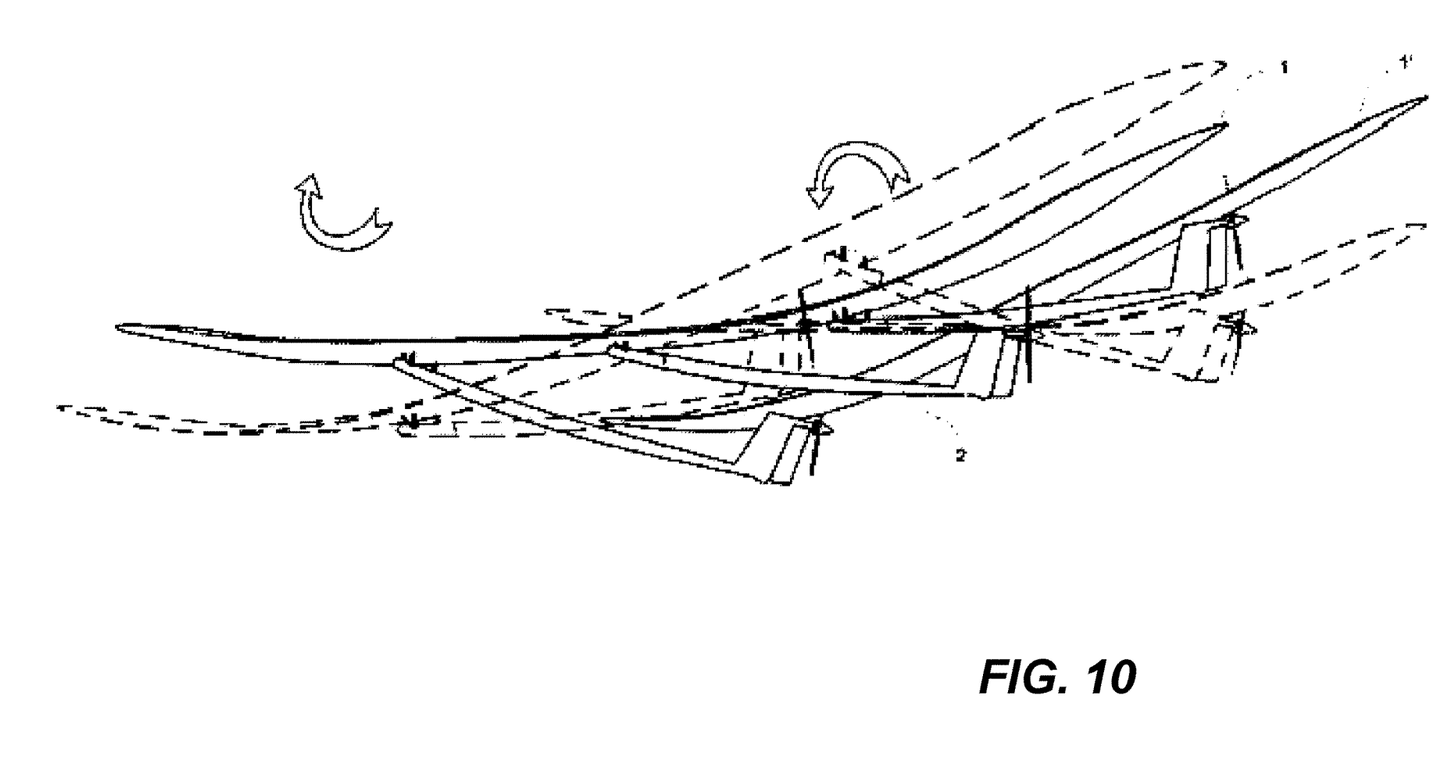
FIGS. 10, 11 and 12 represent the scheme for controlling an aircraft roll, pitch and V-shape for another embodiment of the aircraft.

If the flight mission includes changing a wing V-shape, in step (v) at least one elevator is pivoted so as the angle of attack of the left portion of the corresponding wing and the angle of attack of the right portion of the corresponding wing are increased with respect to the angle of attack of the central portion of the corresponding wing, or so as the angle of attack of the left portion of the corresponding wing and the angle of attack of the right portion of the corresponding wing are decreased with respect to the angle of attack of the central portion of the corresponding wing (FIG. 9).

The deformation data of the wing are collected and analyzed at a predetermined time interval. A designer establishes a frequency at which said deformation data are collected and at which the control system analyzes these data and controls the actuators. It is desirable to constantly monitor deformation of the wing, and the time interval between two consecutive measurements of the deformation of the wing is defined based only on technical characteristics of means, sensors, connections, etc., included into the system for controlling the wing geometric twist.

The invention claimed is:

1. A method for controlling a wing geometric twist of at least one of a plurality of wings of a multi-boom aircraft with an adjustable wing geometric twist by means of a system for controlling the wing geometric twist of the multi-boom aircraft with an adjustable wing geometric twist, said aircraft comprising a first wing and a second wing, the second wing arranged behind and parallel to the first wing, and at least three booms arranged transversely to each of said first wing and second wing, said second wing is rigidly mounted on said booms, wherein each of the booms includes at least one actuator actuated by servomotor, and wherein the first wing is mounted on said booms so that at least a portion of the first wing is configured to be pivoted by said at least one actuator about an axis extending substantially along the first wing, and said system comprises:

a wing shape optimization module configured to determine an optimal shape of the first wing, a deformation sensor installed on sections of the first wing where deformations are maximal or expected to be maximal;

an actuating module comprising servomotors and configured to actuate the at least one actuator, an analytical module configured to receive data from the deformation sensor of the first wing, to determine, based on said data, a current shape of the first wing, to compare the current shape of said wing with the optimal shape of said wing and send a command to the actuating module to actuate the at least one actuator in order to change a distribution of an angle of attack of at least a part of the first wing when the current shape of said wing differs from the optimal shape of said wing, characterized in that the method comprises:
(i) determining, by the wing shape optimization module, the optimal shape of the first wing depending on current flight conditions and a flight mission,
(ii) determining, by the deformation sensor, current values of deformations of the first wing,
(iii) sending the obtained current values of deformations of the first wing to the analytical module,
(iv) determining, by the analytical module, a current shape of the first wing based on the received current values of deformations of the first wing,
(v) comparing, by the analytical module, the current shape of the first wing with the determined optimal shape of the first wing, and
when the current shape of the first wing differs from the optimal shape of the first wing,
(vi) sending a command to the actuating module to actuate the at least one actuator in order to pivot at least the portion of the first wing so that a resultant change of the wing geometric twist of the first wing leads to redistribution of an angle of attack of at least the portion of the first wing such that, due to redistribution of aerodynamic forces, the current shape of the first wing tends to achieve the optimal shape of the first wing.

2. The method of claim 1, wherein for changing a pitch of the aircraft, at least the portion of said first wing is pivoted such that a resulted angle of attack of the first wing along a wingspan of the first wing is increased with respect to an initial angle of attack of the first wing, or such that the resulted angle of attack along the wingspan is decreased with respect to the initial angle of attack of the first wing.

3. The method of claim 1, wherein for changing the roll of the aircraft, at least the portion of said first wing is pivoted such that an angle of attack of one half of the first wing is increased with respect to an initial angle of attack of the first wing, or such that the angle of attack of the first wing is decreased with respect to the initial angle of attack of the first wing.

4. The method of claim 1, wherein for changing a wing V-shape of the first wing, at least the portion of the first wing is pivoted such that an angle of attack of a left portion of the first wing and an angle of attack of a right portion of the first wing is increased with respect to an angle of attack of a central portion of the first wing, or such that the angle of attack of the left portion of the first wing and the angle of attack of the right portion of the first wing is decreased with respect to the angle of attack of the central portion of the first wing.

5. A method for controlling a wing geometric twist of at least one of a plurality of wings of a multi-boom aircraft with an adjustable wing geometric twist by means of a system for controlling the wing geometric twist of the multi-boom aircraft with an adjustable wing geometric twist, said aircraft comprising a first wing and a second wing, the second wing arranged behind and parallel to the first wing, and at least three booms arranged transversely to each of said first wing and second wing, said second wing is rigidly mounted on said booms,
wherein each of the booms includes at least one actuator actuated by servomotor, and
wherein the first wing is mounted on said booms so that at least a portion of the first wing
is configured to be pivoted by said at least one actuator about an axis extending substantially along the first wing, and
said system comprises
a wing shape optimization module configured to determine an optimal shape of the first wing,
a deformation sensor installed on sections of the first wing where deformations are maximal or expected to be maximal;
an actuating module comprising servomotors and configured to actuate the at least one actuator,
an analytical module configured to receive data from deformation sensor of the first wing, to determine, based on said data, a current shape of the first wing, to compare the current shape of said wing with the optimal shape of said wing and send a command to the actuating module to actuate the at least one actuator in order to change a distribution of an angle of attack of at least a part of the first wing when the current shape of said wing differs from the optimal shape of said wing,
characterized in that the method comprises the step of:
(i) determining, by the wing shape optimization module, the optimal shape of the first wing depending on current flight conditions and a flight mission,
(ii) determining, by the deformation sensor, current values of deformations of the first wing,
(iii) sending the obtained current values of deformations of the first wing to the analytical module,
(iv) determining, by the analytical module, a current shape of the first wing based on the received current values of deformations of the first wing,
(v) comparing, by the analytical module, the current shape of the first wing with the determined optimal shape of the first wing, and when the current shape of the first wing differs from the optimal shape of the first wing,
(vi) sending a command to the actuating module to actuate the at least one actuator in order to pivot at least the portion of the first wing so that a resultant change of the wing geometric twist of the first wing leads to redistribution of an angle of attack of at least the portion of the first wing such that, due to redistribution of aerodynamic forces, the current shape of the first wing tends to achieve the optimal shape of the first wing.

6. The method of claim 5, wherein for changing a pitch of the aircraft, in step (v) at least the portion of said first wing is pivoted such that a resulted angle of attack of the first wing along a wingspan of the first wing is increased with respect to an initial angle of attack of the first wing, or such that the resulted angle of attack along the wingspan is decreased with respect to the initial angle of attack of the first wing.

7. The method of claim 5, wherein for changing the roll of the aircraft, in step (v) at least the portion of said first wing is pivoted such that an angle of attack of one half of the first wing is increased with respect to an initial angle of attack of the first wing, or such that the angle of attack of the first wing is decreased with respect to the initial angle of attack of the first wing.

8. The method of claim 5, wherein for changing a wing V-shape of the first wing, in step (v) at least the portion of the first wing is pivoted such that an angle of attack of a left portion of the first wing and an angle of attack of a right portion of the first wing is increased with respect to an angle of attack of a central portion of the first wing, or such that the angle of attack of the left portion of the first wing and the angle of attack of the right portion of the first wing is decreased with respect to the angle of attack of the central portion of the first wing.

9. The method of claim 1, wherein the deformation sensor installed on sections of the first wing where deformations are maximal or expected to be maximal are selected from the group consisting of strain sensors; and/or fiber-optic deformation sensors scattered over a whole length of the first wing; and/or attitude indicators scattered over the whole length of the first wing; and/or video cameras.

10. The method of claim 5, wherein the deformation sensor installed on sections of the first wing where deformations are maximal or expected to be maximal are selected from the group consisting of strain sensors; and/or fiber-optic deformation sensors scattered over a whole length of the first wing; and/or attitude indicators scattered over the whole length of the first wing; and/or video cameras.

* * * * *